United States Patent [19]

Kim

[11] Patent Number: 5,771,350
[45] Date of Patent: Jun. 23, 1998

[54] ASYNCHRONOUS TRANSFER MODE(ATM) NETWORK ADAPTOR FOR THE SIMULTANEOUS PROCESSING OF THE MULTI-CHANNEL TRAFFIC

[75] Inventor: Dong Won Kim, Daejeon, Rep. of Korea

[73] Assignees: Electronics and Telecommunications Research Institute, Daejeon; Korea Telecommunication Authority, Seoul, both of Rep. of Korea

[21] Appl. No.: 630,100

[22] Filed: Apr. 9, 1996

[51] Int. Cl.[6] .................................................. G06F 13/00
[52] U.S. Cl. ...................................... 395/200.8; 370/905
[58] Field of Search ........................... 395/200.8, 200.6, 395/286, 840, 841, 855, 882; 370/904, 905, 469, 364, 431–432, 436

[56] References Cited

U.S. PATENT DOCUMENTS

| | | | |
|---|---|---|---|
| 5,414,707 | 5/1995 | Johnston et al. | 370/79 |
| 5,450,411 | 9/1995 | Heil | 370/94.2 |
| 5,452,297 | 9/1995 | Hiller et al. | 370/60.1 |
| 5,515,373 | 5/1996 | Lynch et al. | 370/79 |
| 5,664,116 | 9/1997 | Gaytan et al. | 395/200.64 |

OTHER PUBLICATIONS

"Service Multiplexing in an ATM environment", Paulo Monteiro, Augusto Casaea, Serafim Nunes, IST/INESC, Rua Alves Redol, 9 1000 Lisboa –Portugal.

*Primary Examiner*—Mehmet B. Geckil
*Attorney, Agent, or Firm*—Jacobson, Price, Holman & Stern, PLLC

[57] ABSTRACT

The present invention relates to an Asynchronous Transfer Mode(ATM) network adaptor for the simultaneous processing of the multi-channel traffic, and includes an R-interface (RIF) means composed of a plurality of first interface means, which output the CBR traffic according to their token signal indicating a point of time occupying the bus or in the case of having the same header address as its own, after receiving the external CBR traffic, and composed of a plurality of second interface means which receive the external VBR traffic and also output it to the external; a Multipled Traffic bus(MT-bus) is connected to the first interface means, being used for transmitting multiplexed channels by providing constant bandwidth necessary for the CBR traffic transmission; a system bus is connected to the first and second interface means, and used for transmitting not only VBR traffic of the second interface means but also the resource control signal of the system; and an ATM Network Interface (ANI) means used for transmitting the CBR traffic from the first interface means to the ATM network over said MT-bus means after receiving a token signal from the first interface means and also contrariwise, and for transmitting the VBR traffic from the second interface means to the ATM network and also contrariwise.

The present invention can process the CBR and VBR traffic simultaneously as mentioned above, by which we can establish the environment of the recently popularized multi-media communication. Therefore, the high priced communication line having the characteristic of the broadband can be used effectively by utilizing the present invention.

9 Claims, 6 Drawing Sheets

ASYNCHRONOUS TRANSFER MODE(ATM) NETWORK ADAPTOR FOR THE SIMULTANEOUS PROCESSING OF THE MULTI-CHANNEL TRAFFIC

BACKGROUND OF THE INVENTION

1. Field of the Invention

The present invention relates to an asynchronous transfer mode (ATM) network adaptor which can be applied to a broadband terminal adaptor(B-TA), a broadband terminal equipment(B-TE) and others, of which broadband ISDN(B-ISDN) is composed, and particularly relates to an ATM (Asynchronous Transfer Mode) network adaptor which can support both multi-channel constant bit rate(CBR) and multi-channel variable bit rate(VBR).

2. Description of Prior Art

The existing ATM network adaptor, which is designed to be applied to a B-TA and a B-TE, etc., is organized to support only one kind of traffic, i.e., either CBR or VBR.

Therefore, the existing ATM network adaptor can not accept composite traffic, such as voice and video data, and it has difficulty establishing the environment of recently popularized multi-media communications. In addition to the above-mentioned problems, the existing ATM network adaptor has another problem in that it can not effectively use expensive communication lines whose characteristic is broadband.

SUMMARY OF THE INVENTION

Accordingly, under the current situation that requires processing the composite traffic, the present invention is intended to deal with the foregoing problems, and its objective is to provide an ATM network adaptor which is able to process simultaneously multi-channel traffic and thereby can be applied to a terminal adaptor and terminal equipment including a host computer, requiring the ATM adapting function.

To accomplish the above mentioned objective, the present invention is featured by the following composition: an R-interface(RIF) means is composed of a plurality of first interface means, which output the CBR traffic according to their token signal indicating a point of time occupying the bus or in the case of having the same header address as its own, after receiving the external CBR traffic, and a plurality of second interface means which receive the external VBR traffic and also output it to the external; a Multipled Traffic bus(MT-bus) means is connected to the first interface means, being used for transmitting multiplexed channels by providing constant bandwidth necessary for the CBR traffic transmission; a system bus means is connected to the first and second interface means, and used for transmitting not only the VBR traffic of the second interface means but also the resource control signal of the system; and an ATM Network Interface (ANI) means which is used for transnitting the CBR traffic from the first interface means to the ATM network over the MT-bus means after receiving a token signal from the first interface means and also contrariwise, and for transmitting the VBR traffic from the second interface means to the ATM network and also contrariwise.

DETAILED DESCRIPTION OF THE PREFERRED EMBODIMENT

The present invention will be described with reference to the preferred embodiment illustrated in the accompanying drawings.

Figure 1:
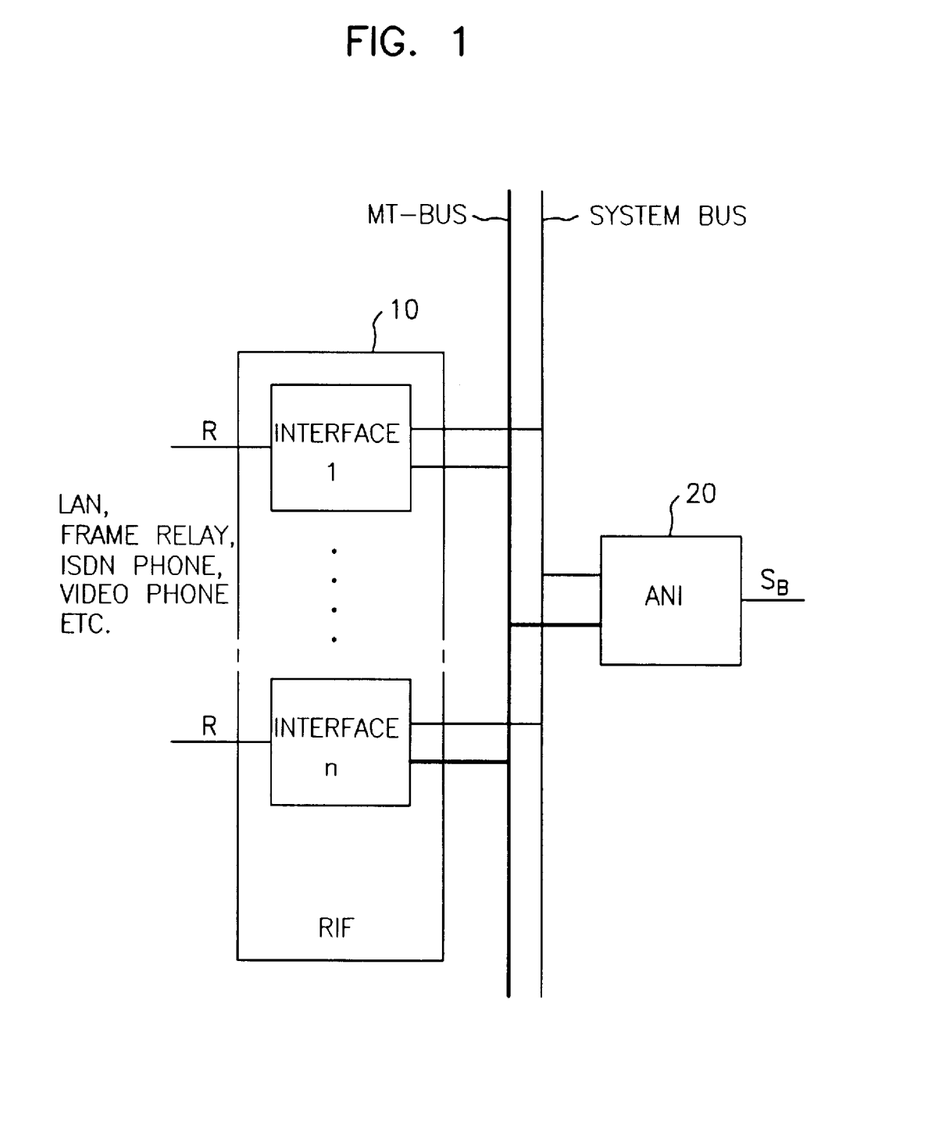
FIG. 1 is a brief overall configuration diagram showing a broadband terminal adaptor in accordance with the present invention.

FIG. 1 is a brief overall configuration diagram showing a broadband terminal adaptor in accordance with the present invention. It illustrates the R-interface(RIF) 10 which is composed of as many as n interface for connecting existing LAN, Frame Relay, an ISDN phone and a video phone, etc., and the ATM Network Interface(ANI) 20 which is used for the connection with a broadband ATM network, respectively.

The RIF 10 receives VBR traffic of ATM Adaption Layer(AAL) type 3/4/5 if connected with LAN or Frame Relay, and on the contrary, receives CBR traffic of AAL type 1 if connected with an ISDN or video phone.

The ANI 20 implements ATM layer protocol and physical layer protocol which are two B-ISDN reference models recommended by ITU-T, and implements not only the signal plane function of Q.2931, Q.SAAL but also the user plane function, and the layer and plane management function. Namely, the ANI 20 implements User Network Interface (UNI) protocol of B-ISDN, and fulfills the interface function to enable various traffic of the RIF 10 to communicate over the ATM network.

For the ATM network to receive the multi-channel CBR and VBR traffic simultaneously, there exists a Multipled Traffic bus(MT-bus), which can guarantee a real-time bandwidth and multiplex a number of channels, between the CBR interface of the RIF 10 and the ANI 20. A MT-bus transmits a token-In/Out signal and a transmission related signal group which includes a Transmission Data Enable(TDEN) signal indicating effective time of transmission data, a Transmission Data Clock(TDCLK) signal indicating synchronous clock of transmission data and Transmission Data(TD0-TD7) formatted by byte or word, and receives a reception related signal group which includes Reception Data Enable (RDEN) signal indicating effective time of reception data, a Reception Data Clock(RDCLK) signal indicating synchronous clock of reception data and Reception Data(RD0-RD7) formatted by the unit of byte or word.

Accordingly, the MT-bus can be used by the unit of byte or word because it adopts a full-duplex parallel system which makes it possible to communicate a transmission signal and a reception signal separately. A transmission signal is a signal to be transmitted from RIF 10 to ANI 20 and implements an operation of limit-1 service method according to the token-In/Out signal. In addition, a reception signal is a signal to be transmitted from ANI 20 to RIF 10. This signal adopts a broadcasting method and each interface of RIF 10 receives only the same data among the information of header fields as its own address by way of a filter.

The VBR traffic, which is a non real-time service, is implemented over a system bus(e.g., VME bus) which has an arbitration device even more suitable for the non real-time packet service. Simultaneously, the system bus implements its peculiar function that it serves as a path over which the main controller controls the system resources, such as RIF 10 and ANI 20.

Figure 2:
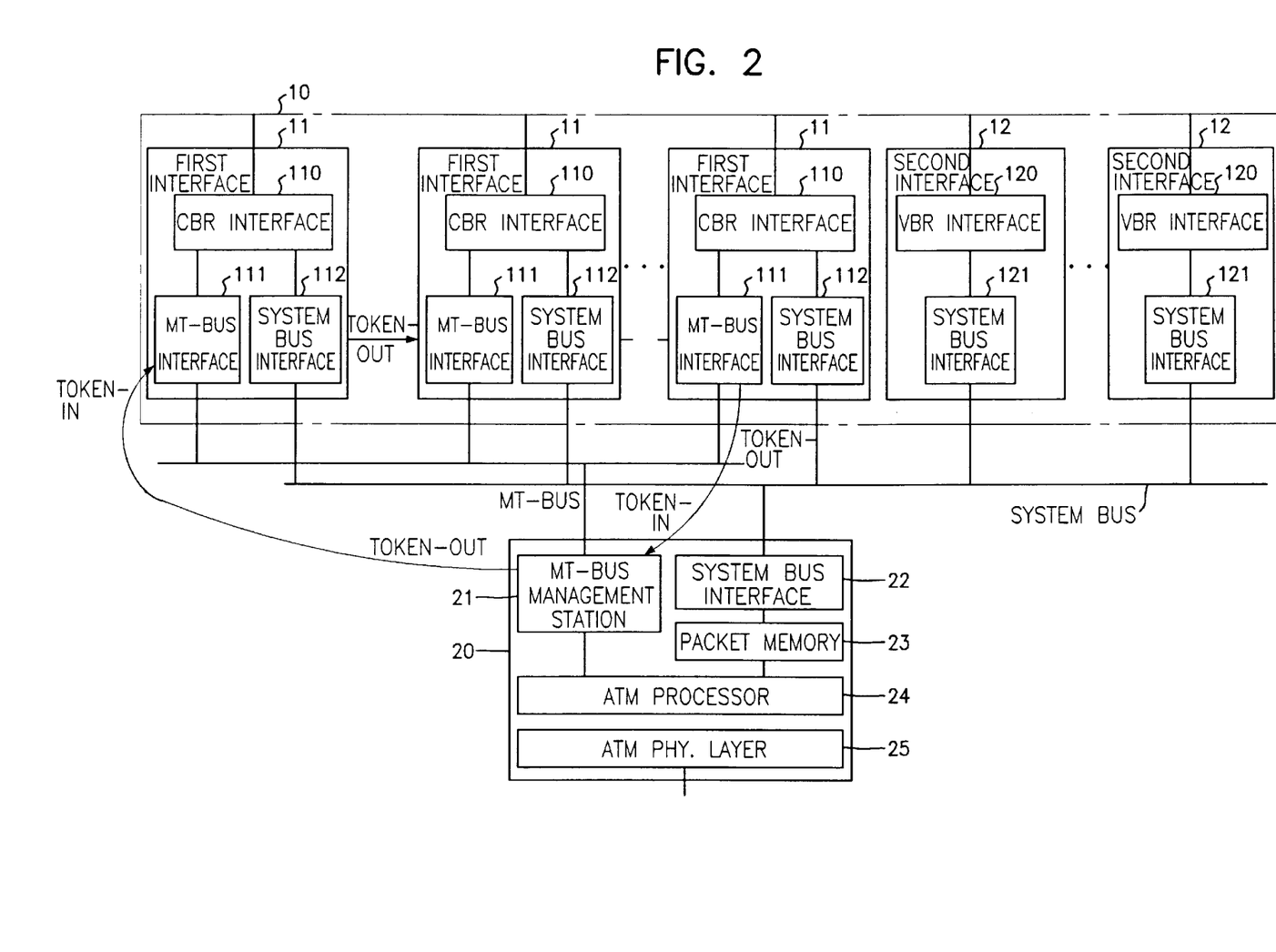
FIG. 2 is a detailed configuration diagram showing an embodiment of a broadband terminal adaptor in accordance with the present invention.

FIG. 2 is a detailed configuration diagram showing an embodiment of a broadband terminal adaptor in accordance with the present invention.

It illustrates the first interface 11, the second interface 12, the CBR interface 110, the MT-bus interface 111, the system bus interface 112, 121 and 22, the VBR interface 120, the MT-bus management station 21, the packet memory 23, the ATM processor 24, and the ATM physical layer 25.

The RIF 10 is composed of a plurality of first interface 11, which transmits the CBR traffic, and a plurality of second interface 12 which transmits VBR traffic.

The first interface 11 consists of the CBR interface 110 for transmitting and receiving the CBR traffic bilaterally; the MT-bus interface 111, connected to the CBR interface 110, for transmitting the CBR traffic to the MT-bus according to the token signal applied from the ANI 20, and, on the contrary, transmitting the CBR traffic received by way of the MT-bus to the CBR interface 110; and the system bus interface 112 connected to the system bus for controlling the system resources.

The second interface 12 consist of the VBR interface 120 for transmitting and receiving VBR traffic, and the system bus interface 121, connected between the VBR interface 120 and the system bus, for controlling the system resources.

The ANI 20 consists of the MT-bus management station 21, the system bus interface 22, the packet memory 23, the ATM processor 24, and an ATM physical layer 25. The function of each component is as follows:

the MT-bus management station 21 transmits a token signal indicating a point of time when the CBR traffic can be transmitted to the first interface 11, and also transmits and receives the CBR traffic by way of the MT-bus;

the system bus interface 22, which is connected to the system bus, transmits and receives VBR traffic and a control signal for controlling the system resources;

the packet memory 23, connected to the system bus interface 22, stores VBR traffic;

the ATM processor 24 deals with the CBR traffic preferentially, and then VBR traffic stored in the packet memory 23 only if the CBR traffic becomes to be empty; and the ATM physical layer 25, connected to the ATM processor 24, fulfills the function of an ATM physical layer.

A token-In/Out signal is generated at the MT-bus management station 21 of the ANI 20, and disappears at the MT-bus management station 21 after passing through the MT-bus interface 111 of the first interface 11.

The CBR traffic transmitted over the MT-bus is stored in the ANI TX FIFO of MT-bus management station 21, and VBR traffic transmitted over the system bus is stored in the packet memory 23, such that the ATM processor 24 can process VBR traffic. The ATM processor 24 implements the process of first and second priority. Namely, the ATM processor 24 transacts the CBR traffic preferentially until the ANI $T_x$ FIFO becomes empty, and then VBR traffic stored in the packet memory 23 can be processed only if the ANI $T_x$ FIFO becomes empty.

Figure 3:
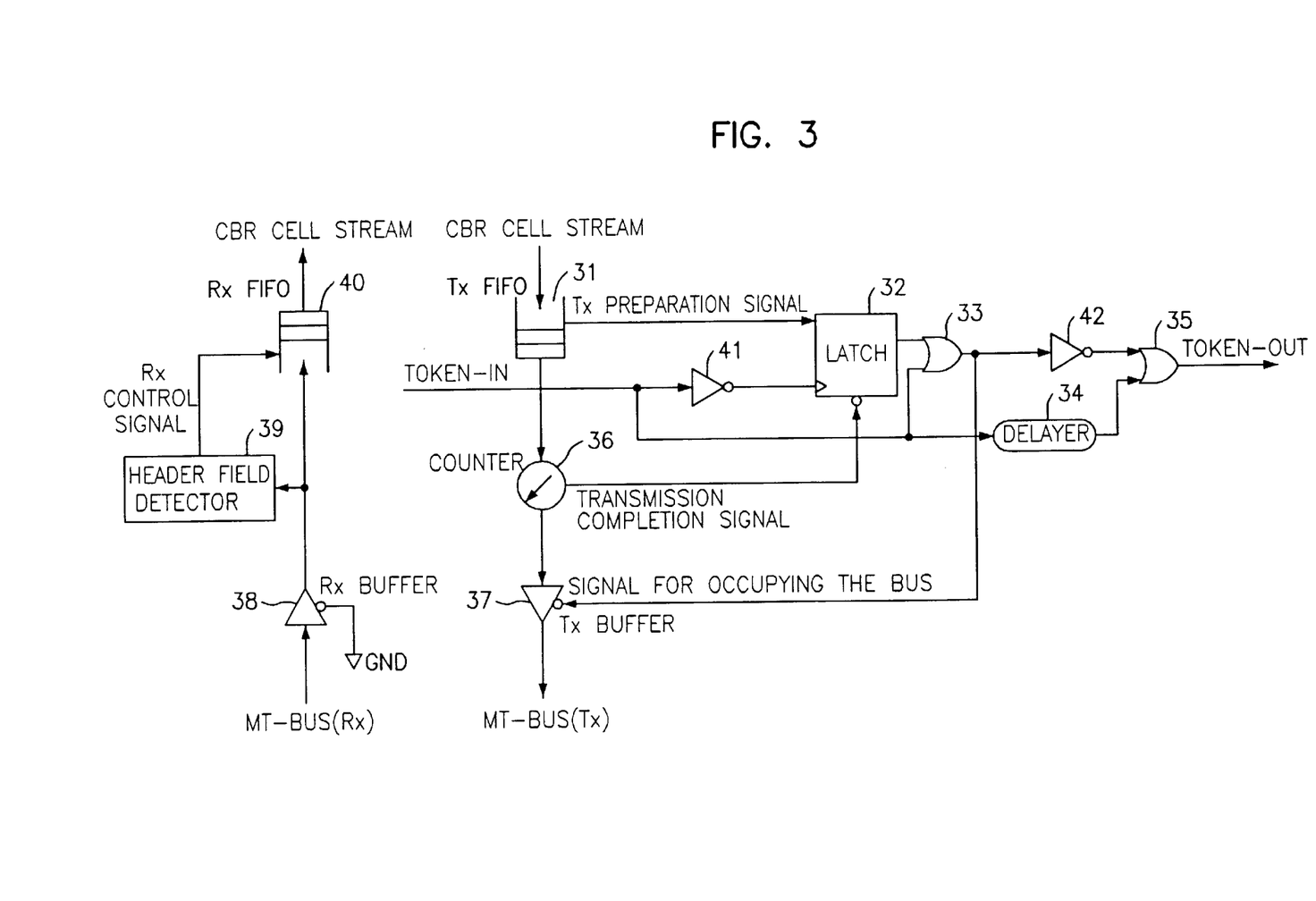
FIG. 3 is a detailed configuration diagram of a Multipled Traffic bus(MT-bus) interface in accordance with the present invention.

FIG. 3 is a detailed configuration diagram of the MT-bus interface 111 in accordance with the present invention.

The MT-bus interface 111 consists of the $T_x$ FIFO 31, the latch 32, the first OR gate 33, the delayer 34, the second OR gate 35, the counter 36, the $T_x$ buffer 37, the $R_x$ buffer 38, the header field detector 39, and the $R_x$ FIFO 40. The function of each component is as follows:

the $T_x$ FIFO 31 stores and subsequently transmits the CBR traffic, which is transmitted from the CBR interface 110, and also transmits a signal indicating the state ready for the transmission, or a transmission signal;

the latch 32 holds and transmits the signal indicating the state ready for the transmission, or a transmission signal at the same time the inverted token-In signal is received;

the first OR gate 33 logically adds the output of the latch 32 and the token-ln signal in order to output a signal indicating the state ready to occupy the MT-bus;

the delayer 34 outputs the token-In signal with some delay to guarantee the settling timing;

the second OR gate 35 logically adds the inverted output of the first OR gate 33 and the output of the delayer 34 in order to make a token-Out signal;

the counter 36 counts the output of the $T_x$ FIFO 31 and transmits a signal indicating the complement of the transmission to the latch 32 when the transmission is finished;

the $T_x$ buffer 37 transmits the CBR traffic according to the output of the first OR gate 33 after buffering the CBR traffic which is stored in the $T_x$ FIFO 31 and passes through the counter 36;

the $R_x$ buffer 38 transmits the CBR traffic received from the MT-bus after buffering;

the header field detector 39 generates a reception control signal for the $R_x$ FIFO 40 to receive the CBR traffic transmitted by way of the $R_x$ buffer 38, provided the address information of the header field applied from the $R_x$ buffer 38 corresponds to the destination cell of the $R_x$ FIFO 40; and the $R_x$ FIFO 40 transmits the output of the $R_x$ buffer 38 according to the reception control signal of the header field detector 39.

The operation of the MT-bus interface 11I will be described with reference to FIG. 7.

First, the process of the transmission is as follows:

the $T_x$ FIFO 31 sends the latch 32 a signal indicating the state ready for the transmission, or a transmission signal whenever the $T_x$ FIFO 31 receives the CBR traffic from the CBR interface 110;

the latch 32 holds and transmits a signal indicating the state ready for the transmission, or a transmission signal at the same time the token-In signal, inverted by the first inverter 41, is received; and the first OR ,ate 33 logically adds the output of the latch 32 and the token-In signal in order to output a signal (OWN) indicating the state ready to occupy the MT-bus, and the output of the first OR gate 33 is sent to the second OR gate 35 by way of the second inverter 42.

Figure 7:
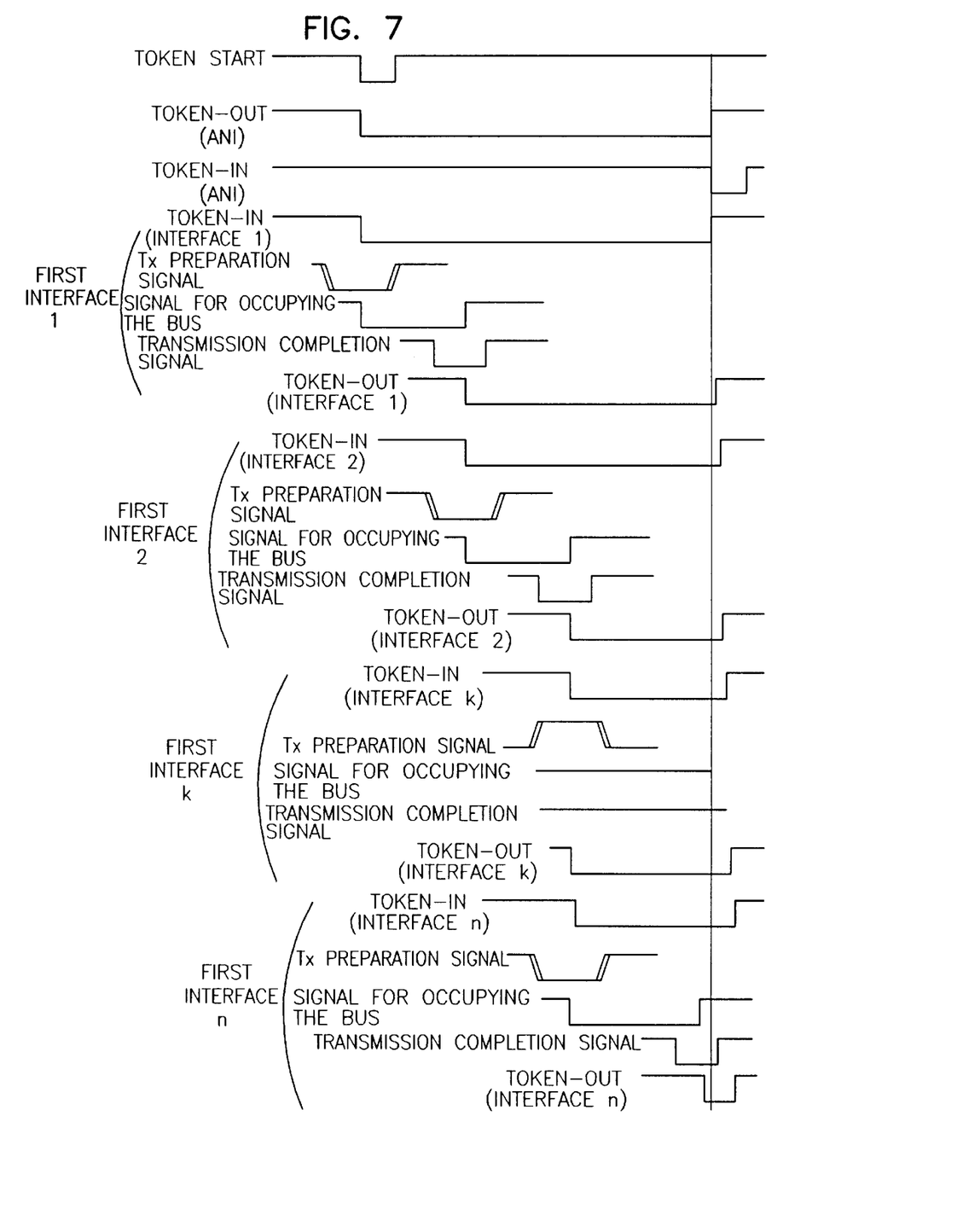
FIG. 7 is a timing chart of the signals of a Multipled Traffic bus(MT-bus) interface in accordance with the present invention.

Thus, as shown in FIG. 7, the OWN signal is released only when both the signal indicating the state ready for the transmission, or a transmission signal and the token-In signal are high active.

On the other hand, the counter 36 counts the cells, by byte in order that the token-Out signal is not released before the transmission of one cell is completed. In addition, the counter 36 generates and sends a transmission completion signal to the latch 32 when the cell stored in the $T_x$ FIFO 31 is completely transmitted.

The transmission completion signal of the counter 36 enables the latch 32 to become clear, so that the OWN signal is canceled. Then, the output of the first OR gate 33 is inverted by the second inverter 42. Together with this inverted signal, the output of the delayer 34 is sent to the second OR gate 35 which logically adds the two signals. The output of the second OR gate 35, the token-Out signal having an active low level, is sent to the next MT-bus interface 111, where the token-Out signal becomes the token-In signal.

Second, the process of the reception is as follows:
after the CBR and VBR traffic, which are transmitted from the ATM physical layer 25, are processed by the ATM processor 24, the CBR traffic is stored in the ANI $R_x$ FIFO of the MT-bus management station 21, and the VBR traffic is stored in the packet memory 23, respectively; and when one cell is completely stored in the ANI $R_x$ FIFO , the reception signal of the MT-bus becomes enabled so that the reception buffer 38 of the MT-bus interface III can receive this signal.

The header field detector 39 generates a reception control signal for the $R_x$ FIFO 40 to receive the CBR traffic transmitted by way of the $R_x$ buffer 38, provided that the address information of the header field applied from the $R_x$ buffer 38 corresponds to the destination cell of the $R_x$ FIFO 40.

The explanation of the way VBR traffic is processed will be omitted as the message communication system, which is generally based on the system bus, is used.

Figure 4:
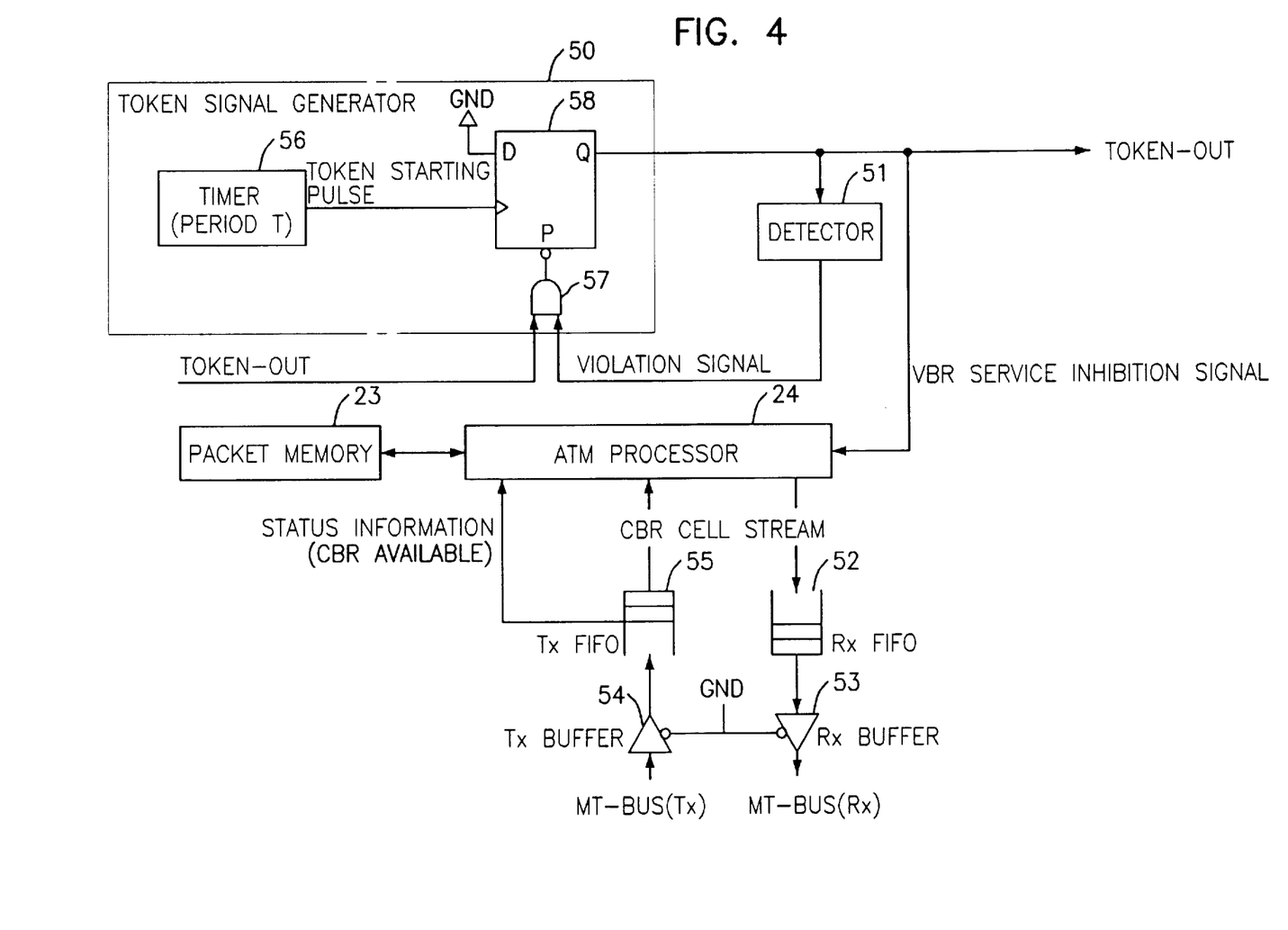
FIG. 4 is a detailed configuration diagram of a Multipled Traffic bus(MT-bus) management station in accordance with the present invention.

FIG. 4 is a detailed configuration diagram of the Multipled Traffic bus(MT-bus) management station 21 in accordance with the present invention The MT-bus management station 21 consists of the token signal generator 50 for generating a token signal, the detector 51 for supervising the rotation of the token signal, the $R_x$ FIFO 52 for storing and transmitting the CBR traffic transmitted from the ATM processor 24, the $R_x$ buffer 53 for buffering the output of the $R_x$ FIFO 52, the $T_x$ buffer 54 for buffering the CBR traffic transmitted from the MT-bus, and the $T_x$ FIFO 55 for transmitting a signal indicating its status and sending the CBR traffic transmitted by way of the $T_x$ buffer 54.

The token signal generator 50 includes the timer 56 for generating a token starting pulse with a certain period, the AND gate 57, and the flip-flop 58.

The AND gate 57 generates a Clear signal by logically multiplying two signals, that is, a violation signal applied by the detector 51 and the token-In signal which circulates through the MT-bus interface 111. The flip-flop 58 generates the token signal when the token starting pulse from the timer 56 is applied to the clock terminal and is cleared by the Clear- signal of the AND gate 57.

The token signal generator 50 is responsible for generating and canceling the token signal, and the timer 56 generates the token starting pulse having a shorter period time T than the inverse of the maximum traffic bandwidth on the condition that the total traffic bandwidth, which is calculated by multiplying the number of the first interface 11 by the traffic bandwidth of an arbitrary first interface, is smaller than the physical layer transmission bit rate.

When the token starting pulse of the timer 56 is applied to the clock terminal of the flip-flop 58, the token-Out signal from the flip-flop 58 is sent to the MT-bus interface 111.

In case the token-In signal, which passed through all the MT-bus interface 111, is applied to the AND gate 57, the token signal is canceled because the CBR service becomes completed during one period. The detector 51 to oversee the rotation period provides the CBR traffic with the real-time service and guaranteed bandwidth by canceling forcefully the token signal unless the token signal returns over a predetermined critical time.

When the CBR and VBR traffic are processed in the ATM processor 24 of ANI 20, the ATM processor 24 is designed to process the CBR traffic preferentially, and then process VBR traffic only when an extra time is given. To accomplish the above-mentioned process, the VBR service inhibition signal, that is, the token-Out signal from the token signal generator 50, is applied to the ATM processor 24 so that the VBR service is inhibited.

The CBR traffic received from the ATM processor 24 is transmitted to the MT-bus by way of the $R_x$ FIFO 52 and the R, buffer 53, sequentially. On the other hand, the CBR traffic transmitted from the MT-bus is first stored in the $T_x$ FIFO 55 by way of the $T_x$ buffer 54 and then is transmitted to the ATM processor 24 together with a signal indicating the status information of the $T_x$ FIFO 55.

Figure 5:
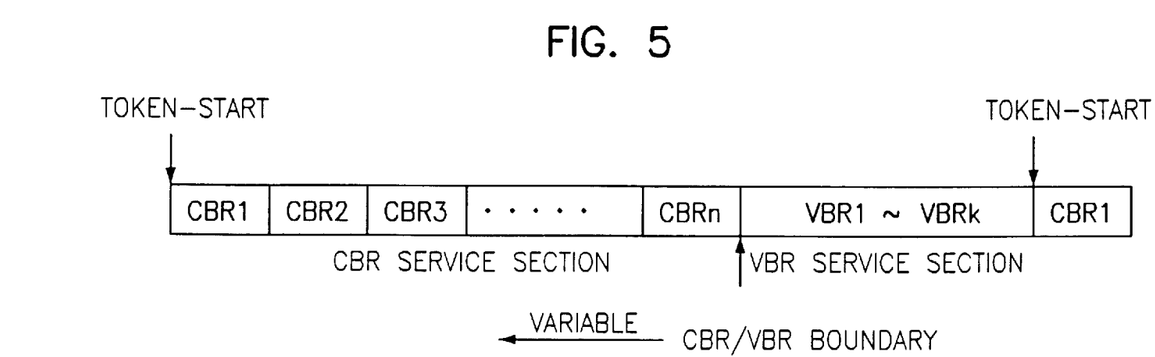
FIG. 5 is a conceptional diagram showing the service section of the mixed CBR and VBR traffic for a period of time.

FIG. 5 is a conceptional diagram showing the service section of the mixed CBR and VBR traffic for a period of time.

One period is composed of the CBR section and VBR section, and the boundary of the two sections is automatically adjusted according to the amount of the CBR traffic. In case the CBR traffic becomes reduced, the wider bandwidth becomes allocated to the VBR traffic. Accordingly, the efficiency of using the bandwidth can be improved.

Figure 6:
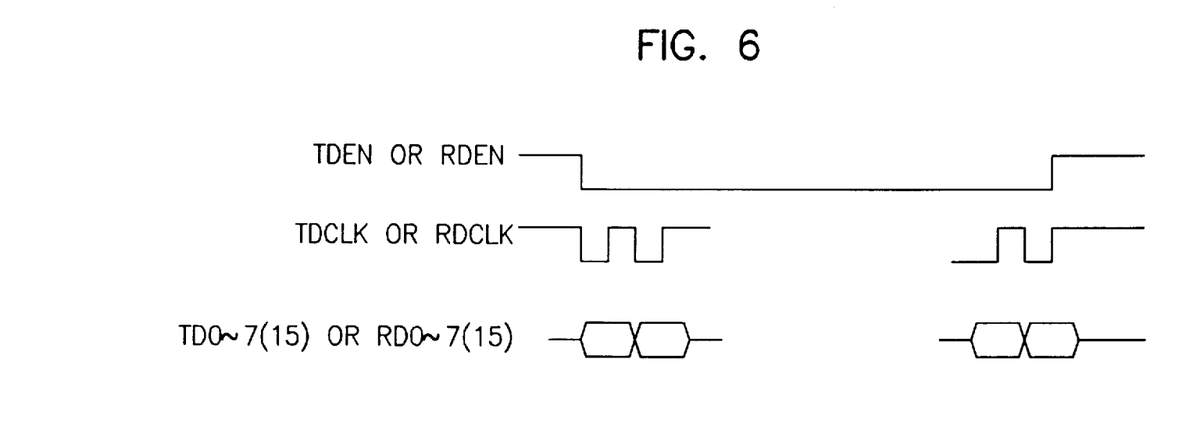
FIG. 6 is a timing chart of the signals of a Multipled Traffic bus(MT-bus) in accordance with the present invention.

FIG. 6 is a timing chart of the transmission related signal group including the Transmission Data Enable(TDEN) signal, the Transmission Data Clock(TDCLK) signal and Transmission Data(TD0-TD7), and the reception related signal group, including the Reception Data Enable(RDEN) signal, the Reception Data Clock(RDCLK) signal and Reception Data(RD0-RD7) while the first interface 11 transmits the CBR traffic to the MT-bus and receives it from the MT-bus after receiving the token signal.

FIG. 7 is a timing chart of the signals of the MT-bus interface 111 while the token-In/Out signal is enabled.

The present invention can process CBR and VBR traffic simultaneously as mentioned above, by which we can establish the environment of the recently popularized multi-media communication. Therefore, a high priced communication line having the characteristic of the broadband can be used effectively by utilizing the present invention.

What is claimed is:

1. An Asynchronous Transfer Mode(ATM) network adaptor for the simultaneous processing of the multi-channel traffic, comprising:
   an R-interface(RIF) means composed of a plurality of first interface means, which output the CBR traffic according to their token signal indicating a point of time occupying the bus or in the case of having the same header address as its own, after receiving the external CBR traffic, and composed of a plurality of second interface means which receive external VBR traffic and also output it to the external;

a Multipled Traffic Bus(MT-bus) means, connected to said first interface means, being used for transmitting multiplexed channels by providing constant bandwidth necessary for the CBR traffic transmission;

a system bus means, connected to said first and second interface means, and used for transmitting not only the VBR traffic of said second interface means but also the resource control signal of the system; and an ATM Network Interface(ANI) means used for transmitting the CBR traffic from said first interface means to the ATM network over said MT-bus means after receiving a token signal from said first interface means and also contrariwise, and for transmitting the VBR traffic from said second interface means to the ATM network and also contrariwise.

2. An Asynchronous Transfer Mode(ATM) network adaptor for the simultaneous processing of the multi-channel traffic in accordance with claim 1, wherein said first interface means comprises:

a CBR interface means for transmitting and receiving the CBR traffic bilaterally;

an MT-bus interface means connected to the CBR interface means for transmitting the CBR traffic to said MT-bus means according to the token signal applied from said ANI means and, on the contrary, transmitting the CBR traffic received by way of said MT-bus means to said CBR interface means; and a system bus interface means connected to said system bus means for controlling the system resources.

3. An Asynchronous Transfer Mode(ATM) network adaptor for the simultaneous processing of the multi-channel traffic in accordance with claim 1, wherein said ANI means comprises:

an MT-bus management means for transmitting a token signal indicating a point of time when the CBR traffic can be transmitted to said first interface means and for transmitting and receiving the CBR traffic by way of said MT-bus means as well;

a system bus interface means connected to said system bus means for transmitting and receiving the VBR traffic and a control signal to control the system resources;

a packet memory means connected to said system bus interface means for storing the VBR traffic;

an ATM processor means for dealing with the CBR traffic preferentially, and then the VBR traffic stored in said packet memory means only if the CBR traffic becomes empty; and an ATM physical layer means connected to said ATM processor means for implementing the function of an ATM physical layer.

4. An Asynchronous Transfer Mode(ATM) network adaptor for the simultaneous processing of the multi-channel traffic in accordance with claim 1, wherein said second interface means comprises:

a VBR interface means for transmitting and receiving VBR traffic; and a system bus interface means connected between said VBR interface means and said system bus means for controlling the system resources.

5. An Asynchronous Transfer Mode(ATM) network adaptor for the simultaneous processing of the multi-channel traffic in accordance with claim 2, wherein said MT-bus interface means comprises:

a $T_x$ FIFO for storing and subsequently transmitting the CBR traffic transmitted from said CBR interface means and for transmitting a signal indicating the state ready for the transmission, or a transmission preparation signal;

a latch for holding and transmitting a signal indicating the state ready for the transmission, or a transmission preparation signal at the same time the inverted token-In signal is received;

a first OR gate for logically adding the output of said latch and the token-In signal in order to output a signal indicating the state ready for occupying said MT-bus means;

a delayer for releasing the token-In signal with a certain delay to guarantee the settling timing;

a second OR gate for logically adding the inverted output of said first OR gate and the output of said delayer in order to make a token-Out signal;

a counter for counting the output of said $T_x$ FIFO and for transmitting a signal indicating the time when the transmission into said latch is finished;

a $T_x$ buffer for transmitting the CBR traffic according to the output of said first OR gate after buffering the CBR traffic which is stored in said $T_x$ FIFO and passed through said counter;

an $R_x$ buffer for transmitting the CBR traffic after buffering the CBR traffic received from said MT-bus means;

a header field detector for generating a reception control signal used to receive the CBR traffic transmitted by way of said $R_x$ buffer provided that the address information of the header field applied from said $R_x$ buffer corresponds to its own destination cell; and an $R_x$ FIFO for transmitting the output of said $R_x$ buffer according to the reception control signal of said header field detector.

6. An Asynchronous Transfer Mode(ATM) network adaptor for the simultaneous processing of the multi-channel traffic in accordance with claim 5, further comprising:

a first inverter for inverting the token-In signal and then transmitting the inverted token-In signal to said latch; and a second inverter for inverting the output of said first OR gate and then transmitting the inverted signal to said second OR gate.

7. An Asynchronous Transfer Mode(ATM) network adaptor for the simultaneous processing of the multi-channel traffic in accordance with claim 3, wherein said MT-bus management means comprises:

a token signal generator for generating a token signal;

a detector for super-vising the rotation of a token signal;

an $R_x$ FIFO for storing and transmitting the CBR traffic transmitted from said ATM processor means;

an $R_x$ buffer for buffering the output of said $R_x$ FIFO;

a $T_x$ buffer for buffering the CBR traffic transmitted from said MT-bus means; and a $T_x$ FIFO for transmitting into said ATM processor means its status information and the CBR traffic received from said $T_x$ buffer.

8. An Asynchronous Transfer Mode(ATM) network adaptor for the simultaneous processing of the multi-channel traffic in accordance with claim 7, wherein said token signal generator comprises:

a timer for generating a token starting pulse with a certain period;

an AND gate for generating a signal(CLEAR signal) by logically multiplying two signals, that is, a violation signal applied by said detector and the token-In signal which rotates through said MT-bus interface means; and a flip-flop for generating a token signal when the token starting pulse from said tinier is applied to the clock terminal and then for being cleared by the Clear signal of said AND gate.

9. An Asynchronous Transfer Mode(ATM) network adaptor for the simultaneous processing of the multi-channel traffic in accordance with claim 8, wherein the token start pulse generated from said time has a shorter period time T than the inverse of the maximum traffic bandwidth on the condition that the total traffic bandwidth, which is calculated by multiplying the number of said first interface means by the traffic bandwidth of said arbitrary first interface means, is smaller than the physical layer transmission bit rate.

* * * * *